(12) United States Patent
Lu et al.

(10) Patent No.: US 8,642,872 B2
(45) Date of Patent: Feb. 4, 2014

(54) MUSIC STEERING WITH AUTOMATICALLY DETECTED MUSICAL ATTRIBUTES

(75) Inventors: Lie Lu, Beijing (CN); Frank Torsten Bernd Seide, Beijing (CN); Gabriel White, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 1107 days.

(21) Appl. No.: 12/132,621

(22) Filed: Jun. 4, 2008

(65) Prior Publication Data

US 2009/0217804 A1 Sep. 3, 2009

Related U.S. Application Data

(60) Provisional application No. 61/033,065, filed on Mar. 3, 2008.

(51) Int. Cl.
*G10H 1/00* (2006.01)
*G10H 1/18* (2006.01)

(52) U.S. Cl.
USPC ............... 84/615; 84/602; 84/603; 84/618; 84/649; 84/653; 84/656

(58) Field of Classification Search
None
See application file for complete search history.

(56) References Cited

U.S. PATENT DOCUMENTS

| | | | |
|---|---|---|---|
| 5,616,876 A | 4/1997 | Cluts | |
| 6,941,324 B2 | 9/2005 | Plastina et al. | |
| 6,987,221 B2 * | 1/2006 | Platt | 84/601 |
| 6,993,532 B1 * | 1/2006 | Platt et al. | 707/736 |
| 6,996,390 B2 * | 2/2006 | Herley et al. | 455/345 |
| 7,024,424 B1 * | 4/2006 | Platt et al. | 1/1 |
| 7,081,579 B2 | 7/2006 | Alcalde et al. | |
| 7,196,258 B2 * | 3/2007 | Platt | 84/600 |
| 7,296,031 B1 * | 11/2007 | Platt et al. | 375/240.12 |
| 7,313,571 B1 * | 12/2007 | Platt et al. | 1/1 |
| 7,345,234 B2 * | 3/2008 | Plastina et al. | 84/615 |
| 7,394,011 B2 * | 7/2008 | Huffman | 84/612 |
| 7,521,623 B2 * | 4/2009 | Bowen | 84/612 |
| 7,548,934 B1 * | 6/2009 | Platt et al. | 1/1 |
| 7,705,230 B2 * | 4/2010 | Bowen | 84/612 |
| 8,438,168 B2 * | 5/2013 | Cai et al. | 707/741 |
| 2003/0221541 A1 * | 12/2003 | Platt | 84/609 |
| 2005/0038819 A1 | 2/2005 | Hicken et al. | |
| 2005/0080673 A1 | 4/2005 | Picker et al. | |

(Continued)

OTHER PUBLICATIONS

Reddy, et al., "Lifetrak: Music in Tune with Your Life", Proc. Human-Centered Multimedia, 2006, pp. 25-34.

(Continued)

*Primary Examiner* — Marlon Fletcher

(57) ABSTRACT

Described is a technology by which a playback list comprising similar songs is automatically built based on automatically detected/generated song attributes, such as by extracting numeric features of each song. The attributes may be downloaded from a remote connection, and/or may be locally generated on the playback device. To build a playlist, a seed song's attributes may be compared against attributes of other songs to determine which other songs are similar to the seed song and thus included in the playlist. Another way to build a playlist is based on similarity of songs to a set of user provided-attributes, such as corresponding to moods or usage modes such as "resting" "reading" "jogging" or "driving" moods/modes. The playlist may be dynamically adjusted based on user interaction with the device, such as when a user skips a song, queues a song, or dequeues a song.

14 Claims, 7 Drawing Sheets

(56) References Cited

U.S. PATENT DOCUMENTS

| | | | |
|---|---|---|---|
| 2005/0172786 A1* | 8/2005 | Plastina et al. ................. 84/600 |
| 2006/0032363 A1* | 2/2006 | Platt .............................. 84/601 |
| 2006/0107822 A1* | 5/2006 | Bowen ........................... 84/612 |
| 2006/0218187 A1 | 9/2006 | Plastina et al. |
| 2007/0025194 A1* | 2/2007 | Morse et al. ................. 369/30.1 |
| 2007/0208771 A1* | 9/2007 | Platt ............................. 707/102 |
| 2007/0220552 A1 | 9/2007 | Juster et al. |
| 2007/0266843 A1* | 11/2007 | Schneider ...................... 84/612 |
| 2008/0156173 A1* | 7/2008 | Bauer ............................ 84/601 |
| 2009/0049979 A1* | 2/2009 | Naik et al. ..................... 84/636 |
| 2009/0139389 A1* | 6/2009 | Bowen ........................... 84/636 |
| 2009/0205482 A1* | 8/2009 | Shirai et al. ................... 84/612 |
| 2009/0231968 A1* | 9/2009 | Ochi et al. ................. 369/47.15 |
| 2010/0332483 A1* | 12/2010 | Brownell ...................... 707/754 |
| 2010/0332568 A1* | 12/2010 | Morrison et al. ............. 707/912 |
| 2012/0125178 A1* | 5/2012 | Cai et al. ........................ 84/609 |
| 2012/0185488 A1* | 7/2012 | Oppenheimer ............... 707/748 |

OTHER PUBLICATIONS

Dittenbach, et al., "PlaySOM: An Alternative Approach to Track Selection and Playlist Generation in Large Music Collections", Proceedings of the Workshop of the EU Network of Excellence DELOS on Audio-Visual Content and Information Visualization in Digital Libraries (AVIVDiLib 2005), Delos, pp. 226-235.

Lu, et al., "Automatic Mood Detection and Tracking of Music Audio Signals", IEEE Transactions on Audio, Speech, and Language Processing, vol. 14, No. 1, Jan. 2006, pp. 5-18.

Lu, et al., "Content-based Audio Classification and Segmentation by Using Support Vector Machines", Multimedia Systems (2002), pp. 1-10.

* cited by examiner

MUSIC STEERING WITH AUTOMATICALLY DETECTED MUSICAL ATTRIBUTES

CROSS-REFERENCE TO RELATED APPLICATION

The present application claims priority to U.S. provisional patent application Ser. No. 61/033,065, filed Mar. 3, 2008 and hereby incorporated by reference.

BACKGROUND

Many people have portable music devices such as an MP3 player, a Microsoft® Zune™ device, or other portable music players, and many of those devices contain hundreds or thousands of songs in their owners' personal music collections. With such large music collections, selecting songs to listen to becomes a challenge. Users want to listen to different songs at different times, but often do not have the time or inclination to repeatedly select songs to play from their personal collection. Also, it is difficult for users to select songs on the move with portable devices, such as when jogging or driving.

Current music players provide a "shuffle" function, which randomly selects songs for playback. This is a basic and simplistic solution that is very limited in its ability to satisfy users requirements in changing songs. In general, the shuffle function provides users with no real control over what is played.

SUMMARY

Briefly, various aspects of the subject matter described herein are directed towards a technology by which songs that are downloaded for playing on a music playing device have attributes automatically detected/generated for them, with those attributes used to select songs for recommended playback. For example, given a seed song, the attributes of the seed song may be compared against attributes of other songs to determine which of the other songs are similar to the seed song. Another way to build a playlist is based on similarity of songs to a set of user provided-attributes, such as corresponding to moods or usage modes such as "resting" "reading" "jogging" or "driving" moods/modes. Those songs which are deemed similar are built into a playlist, whereby a user has a subset of similar songs that are playable without needing to select each of those similar songs to play them. The playlist may be dynamically adjusted based on user interaction, such as when a user skips a song, queues a song, or dequeues a song.

The attributes may be automatically detected by extracting numeric features of the song. The attributes may be downloaded from a remote connection, such as provided in conjunction with the song, and/or may be locally generated on the playback device.

In one aspect, a music playback device is coupled to attribute detection logic that generates attributes of songs, and steering logic that uses the attributes to determine (or guide to) a set of similar songs to play on the playback device. The attribute detection logic may be incorporated into the playback device and/or may be external to the playback device, and coupled thereto via communication means. Then, for example, upon receiving a song, the automatically generated attributes associated with that song may be used to build a playlist comprising the song and at least one other song having similar attributes.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards music "steering," which in general provides users with a "smart" shuffle and/or selection mechanism in that songs are automatically selected for a playlist based upon their characteristics, such as with respect to their similarity to another song's characteristics. In general, this provides a user with an easy and simple way to control what is being played. Further, users can steer the selection process by providing feedback, whether directly or by taking actions such as to manually skip or dequeue a song, or queue a song.

In general, music steering provides interactive music playlist generation through music content analysis, music recommendation, and music filtering. In one example implementation, this is accomplished by automatically detecting some number (e.g. fifty) musical attributes (tags) from each song, by using the tags to build a music recommendation list based on matching the similarity of tags from various songs, and by incorporating implicit (or possibly explicit) feedback to update the recommendation list. As will be understood, because the tags are automatically generated, a more scalable mechanism that is more feasible for a personal music collection is provided.

While many of the examples described herein are generally directed towards a music player and a user's direct interaction with that music player, it is understood that these are only examples. For example, a user may interact with a personal computer or other device, which may playback songs and thus benefit directly from the technology described herein, or may transfer information to a music player such that the user indirectly interacts with the music player via the personal computer or the like. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and music playback in general.

Figure 1:
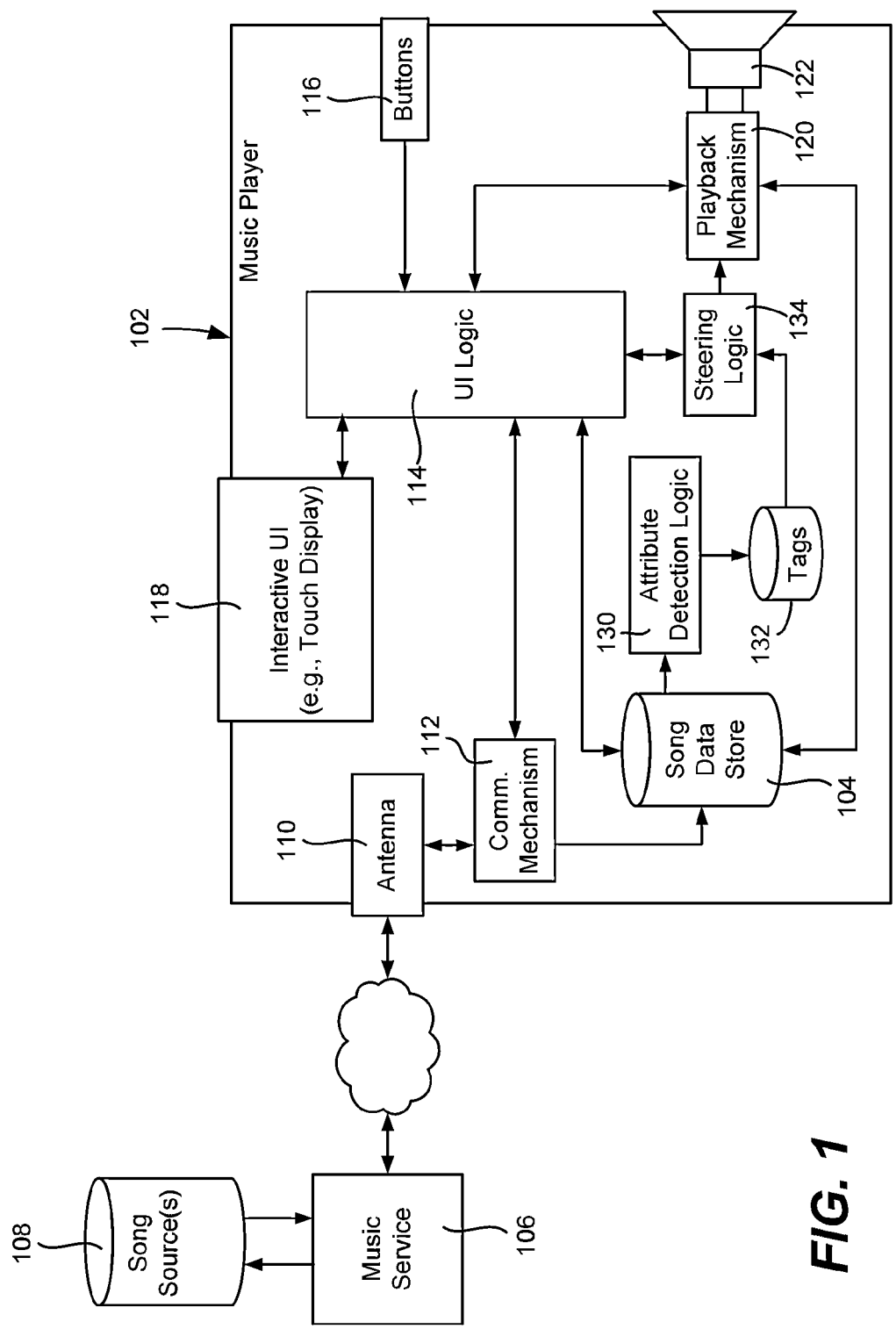
FIG. 1 is a block diagram representing example components of a music player coupled to a music service for obtaining songs in which the music player includes attribute detection logic.
Figure 2:
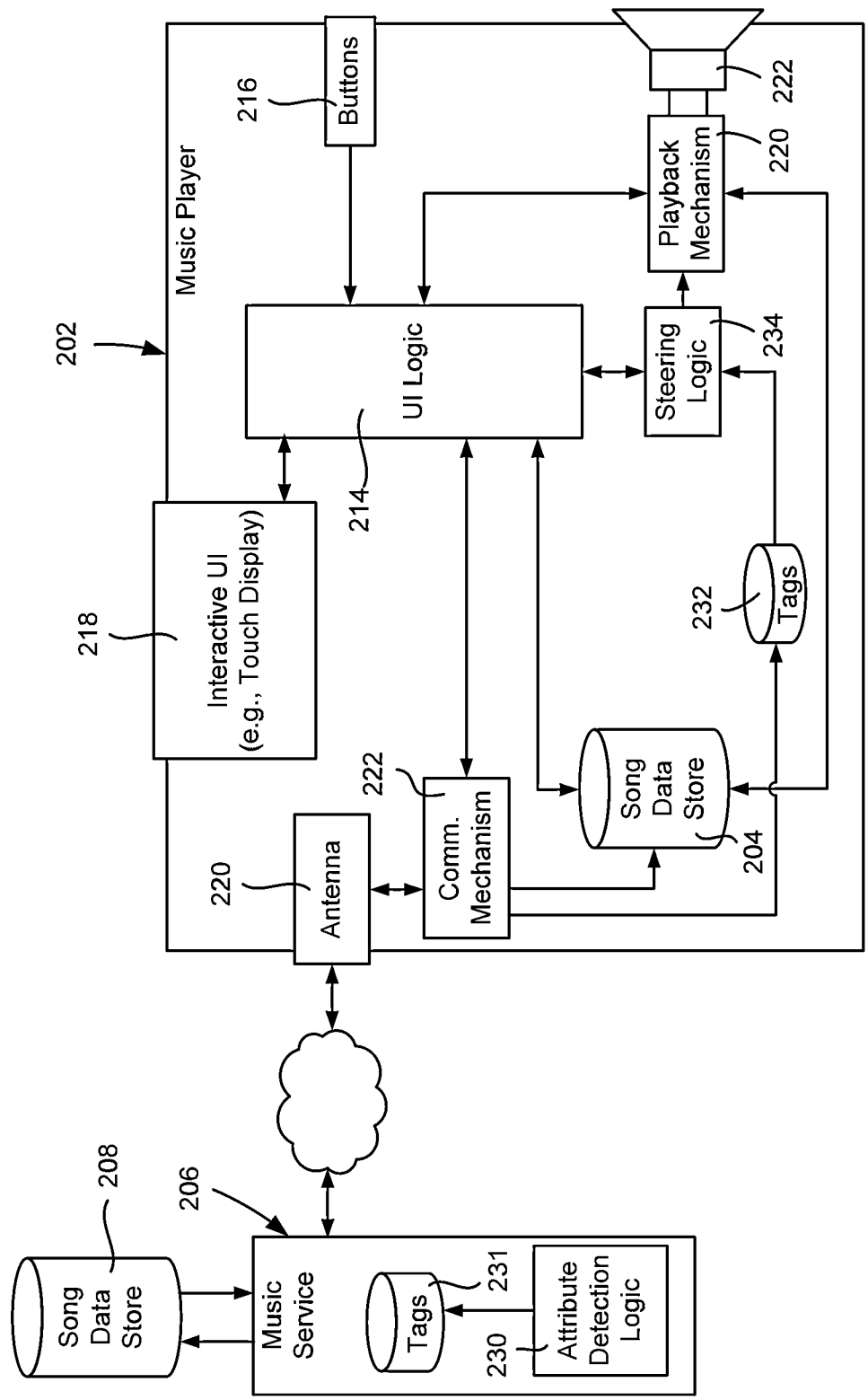
FIG. 2 is a block diagram representing example components of a music player coupled to a music service for obtaining songs in which the music service includes attribute detection logic.

FIGS. 1 and 2 provide example representations of systems directed towards music steering. As generally represented in FIG. 1, a music player 102 obtains and stores songs (e.g., in a local song data store 104) from a music service 106 (or multiple services) coupled to one or more sources of songs 108. In the example of FIG. 1, this is shown via an antenna 110 and a communication mechanism 112, however it is understood that any suitable mechanism may be used to obtain the songs, such as a wired or wireless connection to a personal computer.

As shown in FIG. 1, user interface logic 114 coupled to buttons 116 or the like (e.g., a scroll wheel) and/or a touch-sensitive display 118 allows the user to interact with the device 102. This may be to download songs, as well as to make a playback selection. For playback, a playback mechanism 120 (e.g., representing software and/or hardware including any audio decoders, drivers, amplifiers and so forth) outputs song data accessed from the data store 104 to an output mechanism 122, (shown in FIG. 1 as a speaker-like shape but in actuality is often a wired headphone jack and/or a wireless connection, such as to Bluetooth® headphones).

Turning to an aspect referred to as musical attributes detection, musical attributes detection is generally directed towards a way to measure the similarity between songs by automatically analyzing some number of categories (e.g., ten) that describe musical attributes (properties), which are then processed into a number of tags (e.g., fifty) associated with that song. In one example implementation, categories include genre, instruments, vocal, texture, production, tonality, rhythm, tempo, valence, and energy. Tags may be based on the categories, e.g., there are fifteen tags for "genre", such as hard rock, folk, jazz and rap, twelve tags for "instruments", such as acoustic guitar, acoustic piano, drum, and bass, three tags for "tempo", including fast, moderato, and slow, and so forth. Some tags may have binary yes/no values, while others may be non-binary (e.g., continuous) values, such as "tempo in BPM" (beats per minute).

As described below, musical attributes are detected (which may alternatively be considered as tag generation) for each song, which becomes the basis for music similarity measurement, and thus music steering. This is represented in FIG. 1 by the attribute detection logic 130 coupled to the song data store 104 to process the songs and generate associated tags 132. As also described below, steering logic 134 uses the tags to build one or more playlists that are based on tag similarities between songs. For example, once built, different playlists may be persisted with different names.

FIG. 2 is similar to FIG. 1, (and thus components are generally labeled 2xx instead of 1xx), except that in the example of FIG. 2, the attribute detection logic 230 is shown as being part of the music service 206. In this example, tags 231 are generated by the attribute detection logic 230, and made available along with each song obtained from the service 230, whereby a subset of the tags 231 are locally cached on the music player 202 as tags 232. Other alternatives for generating tags (e.g., from a third-party service, via personal computer generation, and so forth) are feasible. A set of tags may accompany a song download, and/or a user may send song data or a "fingerprint" thereof and receive the associated tag set for that song. Note that remote tag generation allows for greater processing power, training data and so forth, such as to allow for more sophisticated generation algorithms.

Figure 3:
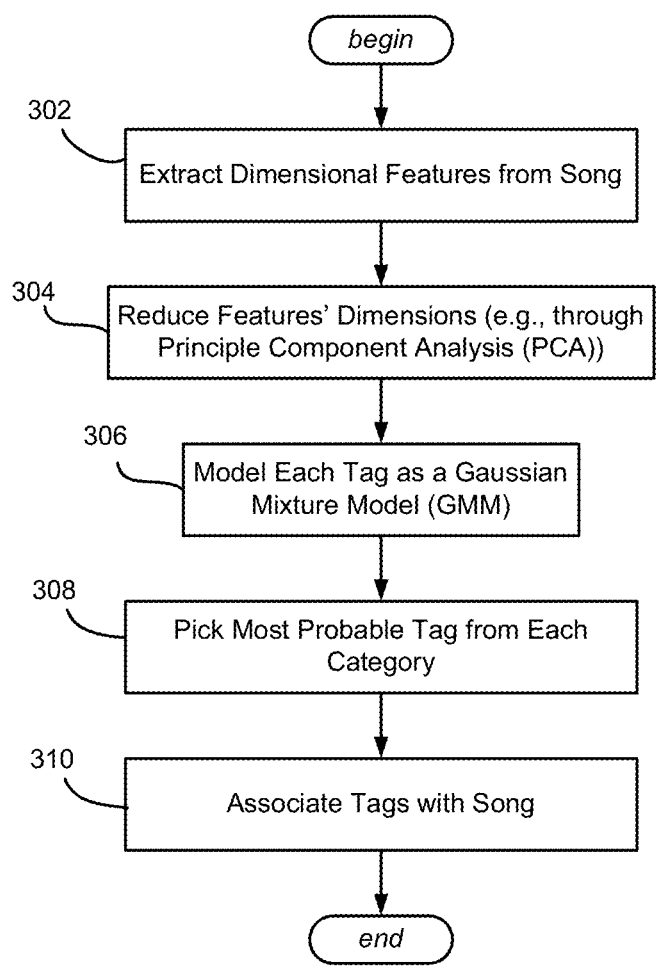
FIG. 3 is a flow diagram generally representing example steps taken to extract attributes based on a song's features and associate those attributes (e.g., as tags) with a song.

In one example implementation generally exemplified by the flow diagram of FIG. 3, music tags are generated in various stages. In a first stage, referred to herein as music feature analysis, various features are extracted (102-dimensional features) that describe low-level music properties, such as timbre and rhythm. This is represented in FIG. 3 by step 302. In a next example step, step 304, the feature dimensions are reduced to 65-dimensions, through Principle Component Analysis (PCA). Step 304 is optional, but it has been found that this step helps to increase detector accuracy while also reducing model size and computational effort.

A next stage, referred to herein as learning, models each tag as a Gaussian Mixture Model (or GMM, a common technique in pattern recognition) using a set of training data and the extracted features. This is represented in FIG. 3 via step 306.

A third stage, referred to herein as automatic annotation, leverages GMM to select the most probable tag (step 308) from each category based on posterior; that is, in one example:

$$\hat{c} = \underset{k}{\operatorname{argmax}} P(c_k \mid x) \qquad (1)$$

where x represents the features of a song, and $c_k$ is the k-th tag in one category. Note that while some tag categories are mutually exclusive (e.g., slow/fast), others are not (e.g., instrument). For mutually non-exclusive categories, tags with a probability above a threshold may be chosen; for some categories, e.g., instruments and genres, a slightly modified criterion may be used, in which multiple tags can be selected. In this example, the number of tags is determined as (in one example):

$$m = \underset{k}{\operatorname{argmin}} \sum_{i=i}^{k} P(t_i \mid x) \geq th \qquad (2)$$

where th is a threshold.

The above provides a generic mechanism that has been found generally suitable for a large range of tags. For specific categories, steps 302-306 may be replaced by category-specific detectors. For example, the "tempo" attribute may be determined by using the well-known technique of repetitive-pattern analysis.

As represented at step 310, the most probable tags are then associated with the song in some appropriate way, which may be dependent on the data format of the song. For example, tags may be embedded into a song's data, appended to a song, included as header information, linked by an identifier, and so forth. Popular audio-file formats such as MP3 and WMA allow embedding of such meta-information. Such associations may be used for locally-generated or remotely-generated tags. A URL may be associated with the song, to provide access to the tags and/or other metadata; this allows improved tag sets to be used over time, such as whenever better tag generation algorithms are developed.

In the above example, each tag is assumed independent. However, some tags may be related, such as one indicating "hard rock" and another indicating "strong rhythm"; a "slow tempo" tag is typically related to a "weak rhythm" tag. Thus, further refinement may be performed to model such correlations, generally to improve the accuracy of tag annotations.

Turning to another aspect referred to herein as music steering, as mentioned above, music steering is generally directed towards interactive music playlist generation through music content analysis, music recommendation, and/or music filtering. To this end, as generally described with reference to FIGS. 4A and 4B, in which processes are related to generating a playlist based on a seed song, the tags that were automatically generated may be used as a measure of similarity between songs, with similar songs added to the playlist, essentially building a music "radio station" that plays one style of music. There may be multiple such playlists from which a user can select. Note that known tag-based radio station concepts do not have automatically generated tags.

Figure 4A:
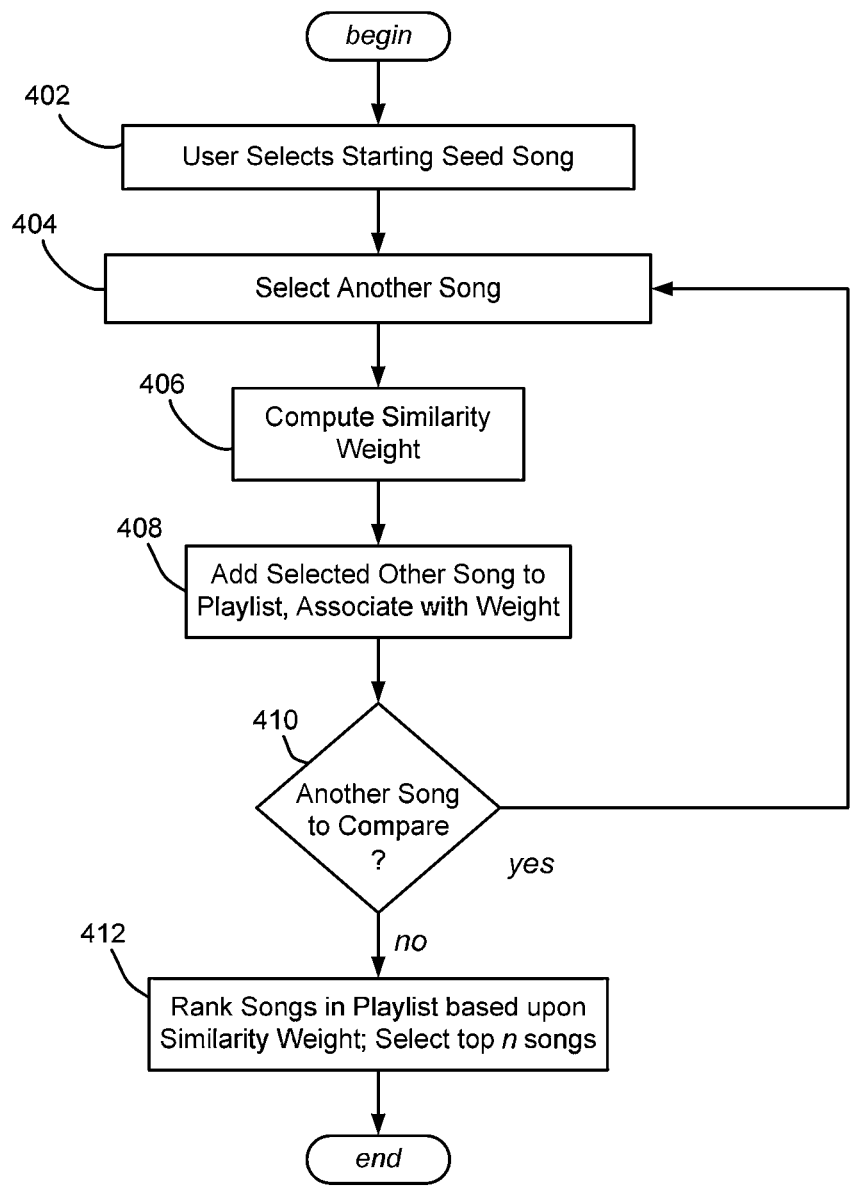
FIG. 4A is a flow diagram generally representing example steps taken to build a playlist given a seed song, in which the playlist is based on songs ranked according to similarity with the seed song.

In the example flow diagram of FIG. 4A, given a "seed" comprising a song (step 402), a list of similar songs is built into a recommended playlist based on the automatically detected musical attributes (tags). Note that a "seed" may comprise a set of tags synthesized (e.g., interpolated such as between a first and a last song) from multiple songs, but for purposes of this example description, a user simply selects a song. Playlist generation may be automatic when the user selects a song, however some user interaction may be desirable, e.g., the user indicates that a playlist be generated from a particular song; (the generated playlist may then be named and persisted). Other ways to initiate playlist generation may include frequency of playback (if a user plays back a song many times), or via sets of tags not necessarily associated with a particular song, e.g., generate a "jogging" playlist based on the songs a user owns that are similar to a set of "jogging" tags, generate a "reading" playlist based on the songs a user owns that match a set of "reading" tags, and so forth.

As can be seen in the example of FIG. 4A, step 404 selects another song, and step 406 computes a similarity weight value based upon an evaluation of the tags of the seed song and the tags of the other song to determine similarity between them. Step 408 adds the song to the playlist (or other data structure) in association with its weight value.

In one example implementation, the similarity between songs is measured based on the above obtained tags, in which each song is represented by a profile comprising a 50-dimensional feature vector indicating the presence or absence of each tag. The similarity between two songs may be measured, e.g., by cosine distance as is known in vector space models. A cosine distance may then be used as the weight. Other pattern recognition technologies (instead of a vector space model) may be used to determining similarity. For example, probabilistic models such as a GMM-based recommendation function may have trained parameters that are possibly refined based upon actual user data.

In the example of FIG. 4A, step 410 repeats the comparison for another song in the song data store, until none remain. Then, as represented by step 412, the songs in the playlist are sorted, with the top n most similar songs selected for the "final" playlist. In which the recommended songs are sorted in a descending order based on their similarity, that is, the most similar song is listed as the first one. User configurable parameters may adjust the list size, and/or a threshold weight may be required for a song to make the playlist. Songs on the playlist (or some subset or subsets thereof, such as those that have sufficiently identical similarity values to the seed song) may be reordered into random order to provide the "smart shuffle" function.

At this time, a recommended song playlist is generated. Without user interaction, the player will play the recommended songs one by one. Users can also check the detected tags of each song, and check why these songs were considered similar by the system.

Figure 4B:
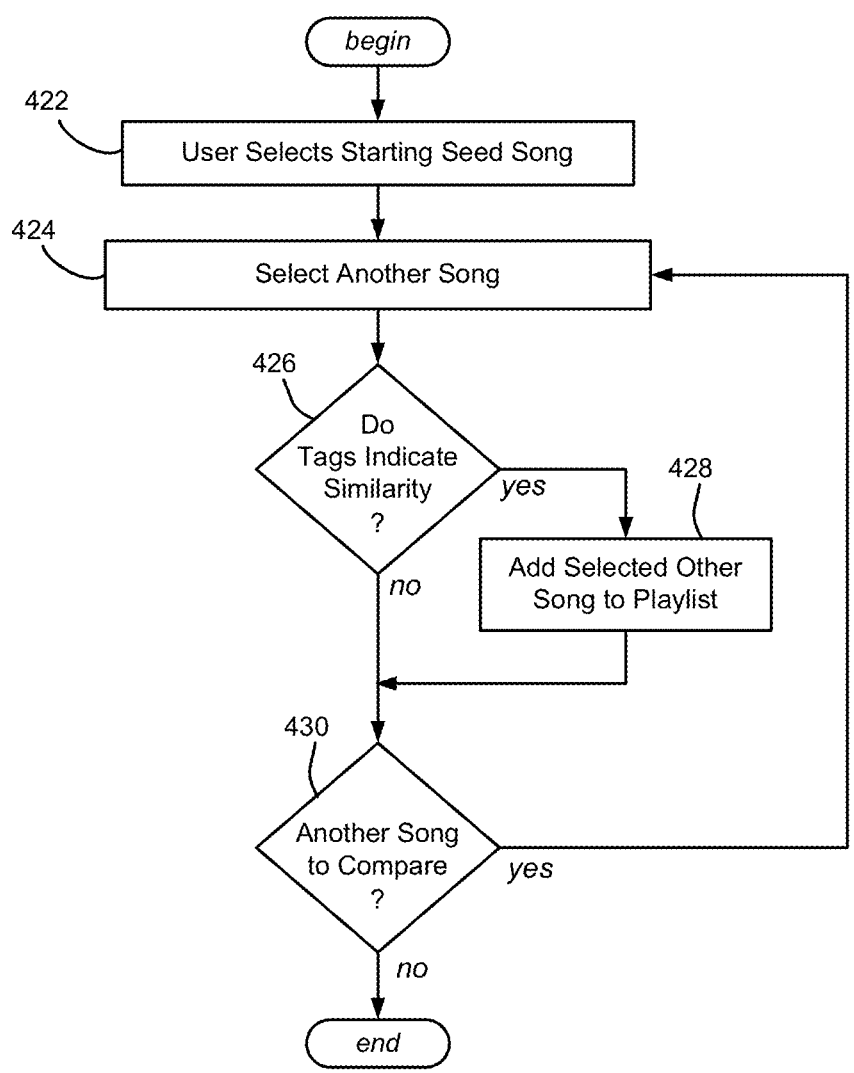
FIG. 4B is a flow diagram generally representing example steps taken to alternatively build a playlist given a seed song, in which the playlist is built with songs that meet a threshold similarity level with respect to the seed song.

In the alternative example flow diagram of FIG. 4B, given a "seed" comprising a song (step 422) or multiple songs combined in some way, a list of similar songs is built into a recommended playlist based on the automatically detected musical attributes (tags). As can be seen in the example of FIG. 4B, step 424 selects another song, and step 426 compares the tags of the seed song with the tags of the other song to determine whether the song is sufficiently similar with respect to a threshold similarity value to be included in the playlist. Known pattern matching techniques may be used to determine similarity. The threshold may be lowered if not enough songs are similar, e.g., the resultant list is too small, or raised if the list is too large. User configurable parameters may adjust the threshold, and/or a maximum list size may be enforced, e.g., by ranking and selecting the top subset of the songs up to a maximum number.

In the example of FIG. 4B, similar songs are added to the playlist via step 428. Step 430 repeats the comparison for another song in the song data store, until none remain. At this time, a recommended song playlist is generated, which may be ranked, randomized and so forth.

Turning to another aspect referred to as implicit relevance feedback, in general the system may continuously (or occasionally) refine the recommendation list based on user interactions. This may be dynamic, e.g., the playlist is updated as the user interacts, and/or after each session. Note that explicit feedback is straightforward, e.g., a user may manually edit a playlist to add and remove songs.

Figure 5:
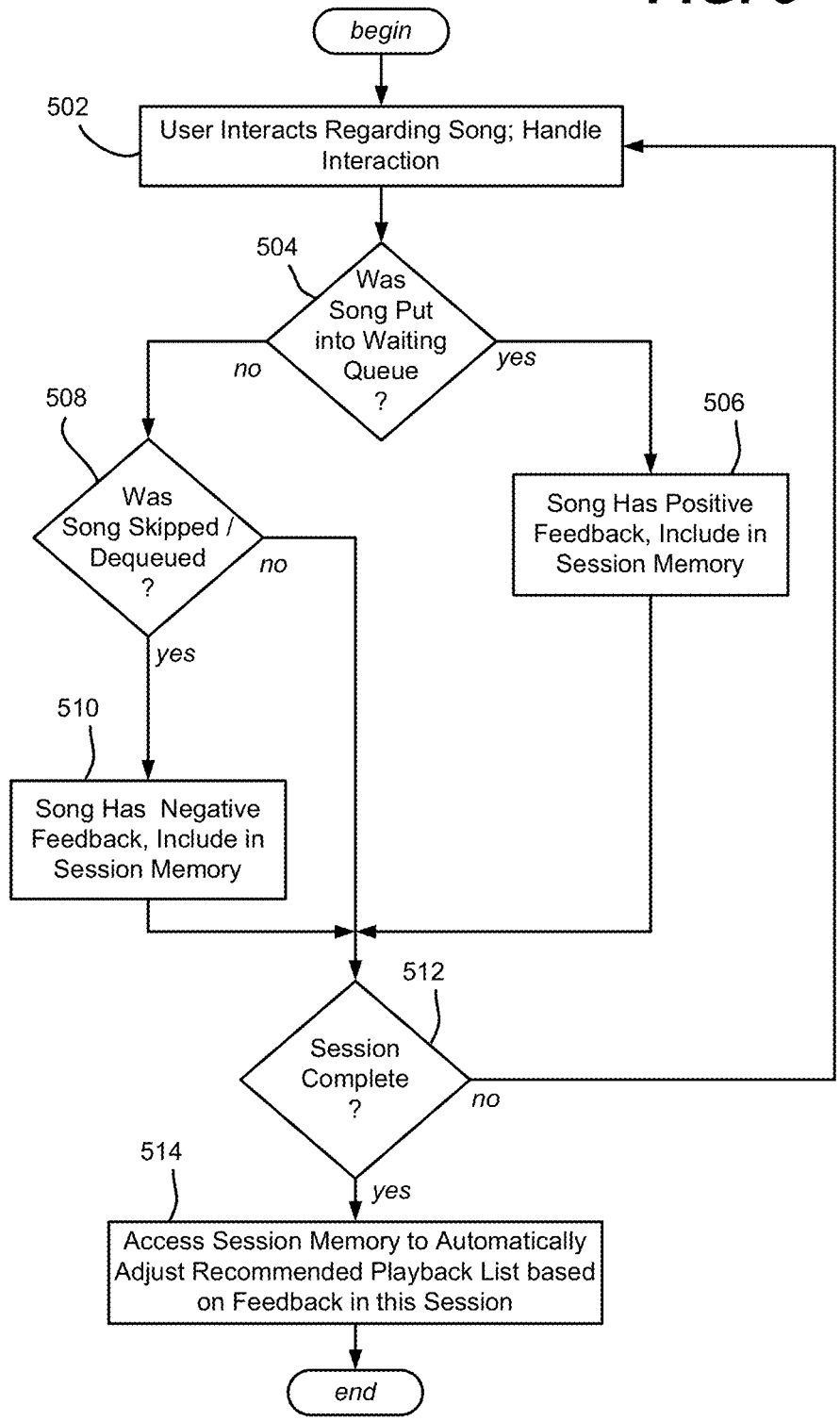
FIG. 5 is a flow diagram generally representing example steps taken to dynamically adjust a playlist based on feedback obtained from user interaction with a music player.

FIG. 5 provides an example flow diagram that operates based on user interaction with the device during a session, beginning at step 502 where the user performs some action with respect to a song, which is handled in a typical manner. For example, the user may skip a song, explicitly move a song into a playback queue, remove a song from a playback queue, or simply select the song and do nothing else with it, except possibly review some metadata associated with the song, such as its length.

For interaction that indicates positive or negative feedback, implicit relevance feedback in the steering logic (e.g., 134, 234) operates to modify the playback list. In this example, if a user adds a song to a playback queue, it is considered positive feedback (e.g., for this session, as recorded into a session memory), as generally represented via steps 504 and 506. Conversely, if a user skipped a song that started to play, or dequeued a song, that is considered negative feedback (steps 508 and 510). Step 512 repeats the process for any other user interactions with this session; when the session is complete, the session memory is processed at step 514 based on the positive and negative feedback data therein to refine the recommendation list.

Other, more granular feedback is feasible. For example, a user can provide ratings for songs, although this requires additional user interaction. However, granularity may be provided via other data combined with implicit actions; for example the playlist may be modified when a user skips a song, but the extent of the modification may be based on how much of a song the user skips, e.g., a lesser modification is made if a user skips ahead after hearing most of a song, as opposed to a greater modification if the user skips it right away. Further, the age and/or popularity of the song may be a factor, e.g., if a user skips or dequeues a currently popular song, the user simply may be tired of hearing it right now; however if a user skips or dequeues an older or obscure (never very popular) song, the user may be indicating a more lasting dislike. Such popularity data may be downloaded like any other information.

Another aspect (which may be related to granularity of feedback) is that a playlist need not contain each song only once, but may instead contain certain songs more than once. The frequency of occurrence may be based on various data, such as how similar a song is to the seed song or user-provided (filtering) attributes, personal popularity, current popularity (personal or general public), user interaction, (e.g., queued songs get more frequency, skipped or dequeued songs get less), and so forth. A shuffling mechanism can ensure that a song is not replayed too often (e.g., in actual time and/or in relative order).

Figure 6:
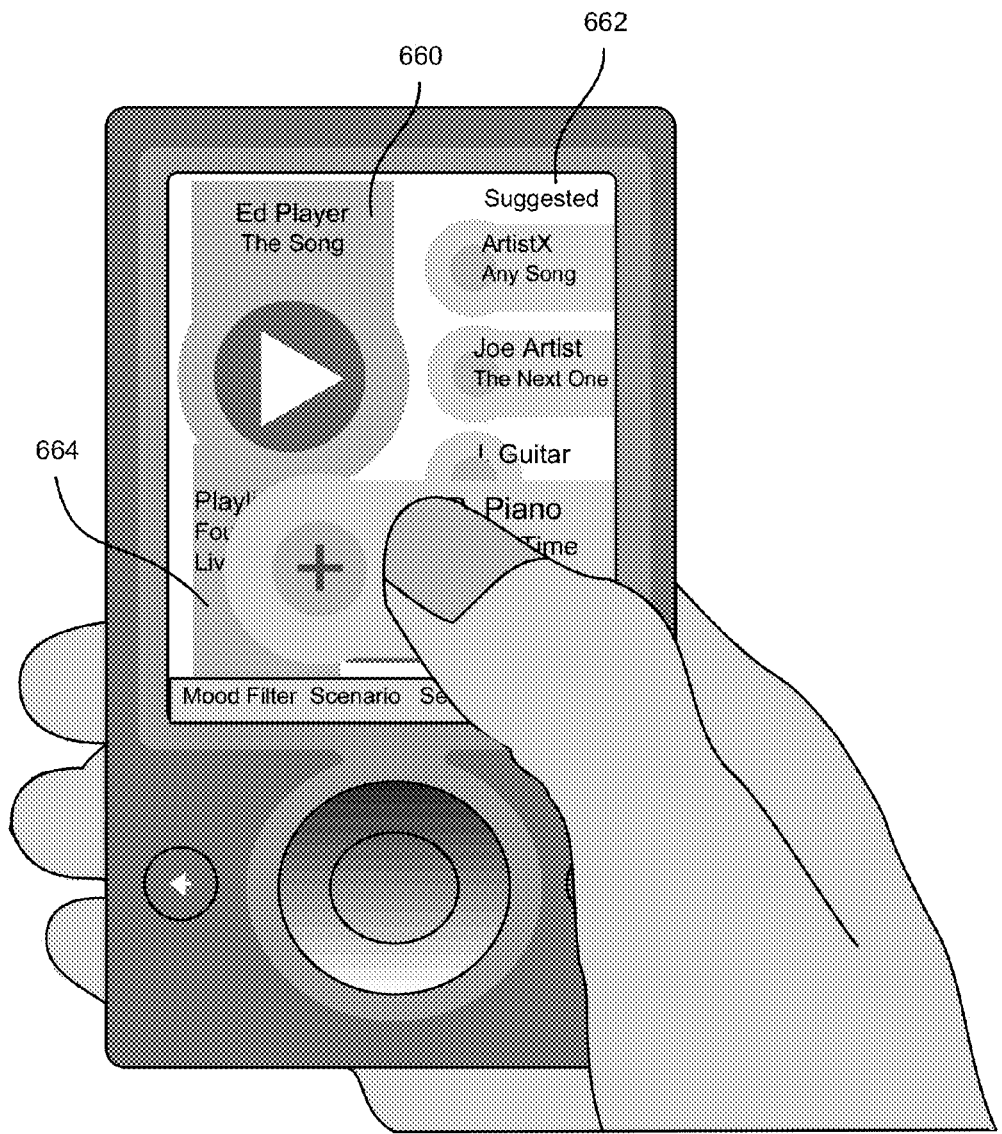
FIG. 6 is a representation of an example music player user interface with which the user may interact, including to modify a playlist.

Users can preview the recommended songs and interact with them, such as (as represented in FIG. 6) to remove a recommended song if disliked or drag a song to the waiting queue. Such interactions implicitly show the user's preference at this moment in time, whereby the recommended music playlist may be automatically adjusted (step 512) based on these interactions. For example, the profile of the seed song may be correspondingly updated by:

$$q' = q + \lambda \left( \frac{1}{n^+} \sum_i s^+ - \frac{1}{n^-} \sum_i s^- \right) \quad (3)$$

where q is the profile of initial seed song, q' is the updated profile, $s^+$ and $s^-$ are the songs of positive feedback and negative feedback, and $\lambda$ is the updating rate.

Another aspect relates to mood-based filtering, such as in the form of a music sifter comprising of a set of sliders or the like by which a user may choose types of songs for a playlist. For example, if users have no specific song to choose as a seed song to generate a playlist (a music "radio station"), the user may set up a music sifter, such as via a set of sliders with each slider corresponding to one music attribute. For example, a "tempo" slider may be moved up or down to indicate a desire for songs with a fast, moderate or slow tempo (a set of radio buttons may be provided to submit a like indication). In addition to sliders, other user interface mechanisms such as check boxes or the like may be used, e.g., a user can use check boxes to individually select types of instruments.

Via filtering, users can set up (and persist) one or more such sifters, such as one for each certain mood. For example, when a user is reading, the user may choose to listen to some light music or some calmer-type songs, e.g., by filtering to obtain a slow tempo, as well as setting other. When jogging, a more energetic, rhythmic set of songs may be desired, with appropriate sifter settings chosen to that end. In addition to user-mood customized settings, common scenarios such as "read" "relax" "exercise" "driving" and so forth may be preloaded or downloaded to a device from a remote source, which are then used to find similarities with the user's personal collection. Users can share their "mood" setups in different scenarios.

Some music devices, such as Zune™, have a wireless connection. With a wireless connection, users can easily share their click-through data (e.g., the implicit-feedback data or any explicit feedback data) and/or their tag sets to improve (e.g., tune) the recommendation algorithms, and/or weights of the tags, which are used in the similarity measure between songs. Users can also share playlists or sets of tags (e.g., a user's mood-chosen tags) with other users. Any improved algorithm may be downloaded to the device, e.g., like a patch. Training data may be obtained based on actual user usage patterns. Note that users can also share their data through a wired connection, such as by uploading information through a personal computer.

Moreover, the music service may advertise music to users, such as by inserting new songs (e.g., temporarily, or only a portion thereof, or as a giveaway promotion such as by a new artist) not yet owned by a user into the recommended music playlist. In this way, the users can discover and purchase new songs they like. This is a non-intrusive form of advertising for products (songs) that are highly-relevant to the user, in order to allow a user to discover and purchase new music.

Turning to an example interface design, FIG. 6 shows a button-style icon design for a portable device with relatively large screen, generally designed for use with one or both thumbs for interaction. In this example, the visible portion comprises three primary sections, including one section 660 that shows the currently playing song. A recommended (suggested) song list occupies another section 662, (e.g., showing up to four songs in one design). A waiting queue is another general section 664; in this example the user's interaction in moving a song obscures part of the sections 662 and 664. In one example, the play order of the songs is the current song, followed by any songs listed in the waiting queue 664 (according to the user's preference based on interaction), followed by the recommended songs in the suggested section 662, (i.e., the playlist/"radio station"). The recommended songs may be in a particular order, or randomly shuffled within the subset of songs deemed similar.

With a touch screen device, the button-style design representing each song facilitates using a thumb for interaction, e.g., a leftward thumb movement may be used to move the song from the suggestion section 662 to the waiting queue 664, while a rightward movement will discard it. Based on these interactions, the songs in the recommended playlist will be correspondingly adjusted as described above. Note that for smaller and/or non-touch sensitive devices, a still meaningful use of this technology may be provided with only a single button—"skip"—or the like to allow the users to skip songs and correspondingly update the songs in the recommended playlist.

Other aspects are directed to the profiles, and include that profiles need not be yes/no groupings of attribute tags, but can instead have more granular values. For example, a tempo tag indicating fast may have a value indicating very fast, fast, or somewhat fast (but not quite moderate), or simply a numeric value denoting BPM (beats per minute). Further, the weights in the vector corresponding to the tags within a profile need not be the same, e.g., genre may have more weight than tempo when determining similarity. The weights may be initially trained using training data, and/or retrained based on user feedback.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method performed by a music playing device with which songs are downloaded for playing, the music playing device including a processor and memory, the method comprising:

storing downloaded songs on the music playing device along with attribute tags respectively associated with the songs, the attribute tags having been automatically detected by analyzing binary playable sound data of the songs;

receiving a user selection of a seed song, and using the attribute tags associated with the seed song and attribute tags of respective candidate songs to compute similarity metrics representing similarity of the candidate songs, respectively, to the seed song, wherein a similarity metric is computed based on the attribute tags of the seed song and the attribute tags of a corresponding candidate song and has a value according to similarity of the attribute tags of the seed song and the attribute tags of the corresponding candidate song;

based on the similarity metrics automatically adding some of the candidate songs to an active playlist, the active playlist currently active on the music playing such that one of the songs in the active playlist is being currently played by the music playing device; and providing a monitoring process that repeatedly and automatically adjusts song membership in the active playlist based on similarity metrics by detecting user interactions with individual songs as they are playing on the music playing device, the user interactions comprising fast-forwarding or skipping portions of songs when being played, and by using the attribute tags of the interacted-with songs to automatically compute new similarity metrics of songs in the active playlist and songs not in the active playlist, and based on the new similarity metrics automatically selecting one or more songs that are automatically added to the active playlist and one or more songs that are automatically removed from the active playlist, whereby the user steers the song membership of the active playlist by interacting with the songs on the music playing device, the steering comprising weighting similarity metrics of some of the songs according to the some of the songs having been fast-forwarded or skipped when being played.

2. The method of claim 1 wherein the user interaction comprises skipping a song in the active playlist, queuing a song into the active playlist, or dequeuing a song from the active playlist.

3. The method of claim 1 wherein automatically detecting the attribute tags comprises extracting numeric features of a song.

4. The method of claim 1 wherein using the attribute tag to select one or more songs for recommended playback comprises comparing user-provided attribute tags against the automatically detected attributes from the songs to sift a subset of the songs based on similarity to the user-provided attributes.

5. A computing device for playing songs, comprising:
storage storing downloaded songs on the computing device along with sound attributes respectively associated with the songs, the attributes having been automatically detected by analyzing binary playable sound data of the songs;
a music playback application that plays the stored songs and stores and plays playlists comprising lists of the stored songs, the playlists including an active playlist that is currently being played which includes a current song currently being played;
steering logic that uses the sound attributes of a stored song and the attributes of a plurality of the stored songs to determine a set of songs similar to the stored song, wherein the user interacts with a given song by fast-forwarding or skipping a portion of the given song being played from the current playlist, the sound attributes of the interacted-with given song and the sound attributes of candidate songs, including songs in and not in the playlist, are used to compute metrics of similarity of the respective candidate songs to the given song, a similarity metric of a candidate song being computed from its sound attributes and from the sound attributes of the given song and being weighted according to an extent of the portion fast-forwarded or skipped or an extent of another portion that was played prior to the song being fast-forwarded or skipped, where based on the similarity metrics one of the candidate songs is automatically added to the active playlist and one of the candidate songs is automatically removed from the active playlist, whereby while the active playlist is playing the user interaction with the song steers the song membership of the active playlist.

6. The system of claim 5 wherein the analyzing is performed by the computing device after the stored songs are downloaded from a music download service.

7. The system of claim 5 wherein the attributes of each song are represented by a vector, and the steering logic determines a similarity metric for two songs based on the corresponding vectors.

8. The system of claim 5 wherein the attributes at least one song corresponds to user-provided data.

9. The system of claim 5 wherein the playback device includes a user interface having a button-style design.

10. A method performed by a computing device, the method comprising:
executing a media player that accesses a library of music files available to be played by the computing device, wherein each music file comprises sound data and a corresponding set of musical attributes automatically derived by analyzing the sound data of the music file, wherein sound data of each music file can be played by the computing device to produce sound;
providing a playlist of various of the music files, including a current playlist that is currently playing; and
in the background while the current playlist is playing, repeatedly and automatically readjusting membership of music files in the current playlist in based on user interactions with the music files in the library of music files that also occur while the current playlist is playing, wherein the repeatedly performed readjusting comprises:
ranking music files in the current playlist together with other music files in the library, where the ranking is based on the sets of musical attributes of those music files and based on the sets of musical attributes of the interacted-with music files such that a given music file is ranked according to similarity of its musical attributes to musical attributes of one or more of the interacted-with music files and according to a weight based on amounts of songs skipped or fast-forwarded while being played or based on amounts of songs played when skipped or fast-forwarded, and based on the ranking automatically adjusting membership of music files in the current playlist such that music files are added to and removed from the current playlist.

11. A method according to claim 10, wherein the interacting comprises at least one of skipping a song in the active playlist, dequeuing a song in the active playlist, or adding a song to the active playlist.

12. A method according to claim 10, wherein the ranking is performed by adjusting a profile of a seed music file that is used to compute similarity measures between the seed music file and candidate music files, the similarity measures being used to perform the ranking.

13. A method according to claim 12, wherein the profile comprises a vector of weights of the attributes of the seed music file and some interactions increase weights and some interactions decrease weights.

14. A method according to claim 10 wherein the user interactions are stored in an interaction history and the interaction history is periodically used to perform the ranking.

* * * * *